United States Patent
Lena

(10) Patent No.: US 9,975,706 B2
(45) Date of Patent: May 22, 2018

(54) APPARATUS FOR FEEDING ROD-SHAPED ARTICLES IN A PACKAGING MACHINE

(71) Applicant: SASIB S.p.A., Castel Maggiore (Bologna) (IT)

(72) Inventor: Matteo Lena, Bologna (IT)

(73) Assignee: SASIB S.P.A., Castel Maggiore (IT)

( * ) Notice: Subject to any disclaimer, the term of this patent is extended or adjusted under 35 U.S.C. 154(b) by 895 days.

(21) Appl. No.: 13/920,546

(22) Filed: Jun. 18, 2013

(65) Prior Publication Data
US 2013/0341345 A1     Dec. 26, 2013

(30) Foreign Application Priority Data

Jun. 20, 2012 (IT) .............................. BO2012A0334

(51) Int. Cl.
B65G 47/14     (2006.01)
B65B 19/04     (2006.01)
B65B 19/10     (2006.01)

(52) U.S. Cl.
CPC .......... *B65G 47/1407* (2013.01); *B65B 19/04* (2013.01); *B65B 19/10* (2013.01)

(58) Field of Classification Search
None
See application file for complete search history.

(56) References Cited

U.S. PATENT DOCUMENTS

| | | | | |
|---|---|---|---|---|
| 1,765,820 A | * | 6/1930 | Bronander | B65B 19/10 221/68 |
| 1,961,047 A | * | 5/1934 | Horgan | B65B 19/10 53/149 |
| 1,984,808 A | * | 12/1934 | Popov | B65B 19/10 53/151 |
| 2,334,142 A | * | 11/1943 | Arelt | B65B 19/10 53/149 |
| 2,621,840 A | * | 12/1952 | Kemp | B65B 19/10 53/149 |
| 3,106,282 A | * | 10/1963 | Schmermund | B65B 19/10 198/418.1 |

(Continued)

OTHER PUBLICATIONS

Italian Search Report dated Feb. 15, 2013 from counterpart application.

*Primary Examiner* — Hemant M Desai
*Assistant Examiner* — Mobeen Ahmed
(74) *Attorney, Agent, or Firm* — Shuttleworth & Ingersoll, PLC; Timothy J. Klima

(57) ABSTRACT

An apparatus for feeding rod-shaped articles includes a hopper having at least one mouth for dispensing the articles, subdivided by vertical walls parallel to each other forming vertical channels positioned side by side, each accommodating a stack of the articles At a position above an upper edge of each wall is positioned a cylindrical roller oscillating in both directions about its axis parallel to the axes of the articles for facilitating entry in the channels. The axis of each roller is offset laterally in a horizontal direction relative to the upper edge of the wall below and adjacent to it, and the upper edges of the walls relative to each channel are positioned at different levels such that the width of the passage defined between each pair of adjacent rollers lying above the walls of the channel is slightly greater than the diameter of the article.

15 Claims, 3 Drawing Sheets

(56) References Cited

U.S. PATENT DOCUMENTS

| | | | | |
|---|---|---|---|---|
| 3,435,940 A | * | 4/1969 | Ariosto | B65B 19/04 198/418.3 |
| 3,531,911 A | * | 10/1970 | Goffredo | A24C 5/35 53/151 |
| 3,590,556 A | * | 7/1971 | Focke | B65B 19/223 53/151 |
| 4,061,234 A | * | 12/1977 | Bantien | B65B 19/10 198/418.1 |
| 4,096,938 A | * | 6/1978 | Payne | B65B 19/04 198/418.1 |
| 4,207,720 A | * | 6/1980 | Tolasch | A24C 5/354 221/200 |
| 4,364,464 A | * | 12/1982 | Manservisi | B65B 19/105 198/418.3 |
| 4,531,627 A | * | 7/1985 | Mattei | B65B 19/105 198/418.3 |
| 4,571,917 A | * | 2/1986 | Wheless | B65B 19/08 131/283 |
| 4,571,918 A | * | 2/1986 | Zeitel | B65B 19/10 53/149 |
| 4,574,958 A | * | 3/1986 | Manservisi | B65B 19/30 209/535 |
| 4,648,232 A | * | 3/1987 | Brinker | A24C 5/345 209/535 |
| 4,711,339 A | * | 12/1987 | Nagata | B65B 19/105 198/418.2 |
| 4,827,691 A | * | 5/1989 | Hanada | B65B 19/04 221/200 |
| 4,953,711 A | * | 9/1990 | Focke | B65B 19/30 209/535 |
| 5,179,817 A | * | 1/1993 | Barnes | B65B 19/221 53/148 |
| 5,464,027 A | * | 11/1995 | Bina | A24C 5/325 131/282 |
| 5,522,493 A | * | 6/1996 | Spada | B65B 19/04 131/282 |
| 5,544,515 A | * | 8/1996 | Zwiechowski | B65B 19/10 53/148 |
| 5,548,941 A | * | 8/1996 | Portaro | B65B 19/04 198/418.1 |
| 5,611,191 A | * | 3/1997 | Bailey | B65B 19/04 131/282 |
| 6,092,642 A | * | 7/2000 | Boldrini | B65B 19/105 198/418.2 |
| 6,213,283 B1 | * | 4/2001 | Bailey | B65B 19/105 198/418.2 |
| 6,269,931 B1 | * | 8/2001 | Tale' | B65B 19/10 198/418.3 |
| 6,298,976 B1 | * | 10/2001 | David | B65B 19/10 198/418.1 |
| 7,364,052 B2 | * | 4/2008 | Spatafora | A24C 5/325 131/280 |
| 7,571,798 B2 | * | 8/2009 | Spatafora | A24C 5/35 198/347.1 |
| 2006/0108199 A1 | * | 5/2006 | Spatafora | B65B 19/10 198/453 |

\* cited by examiner

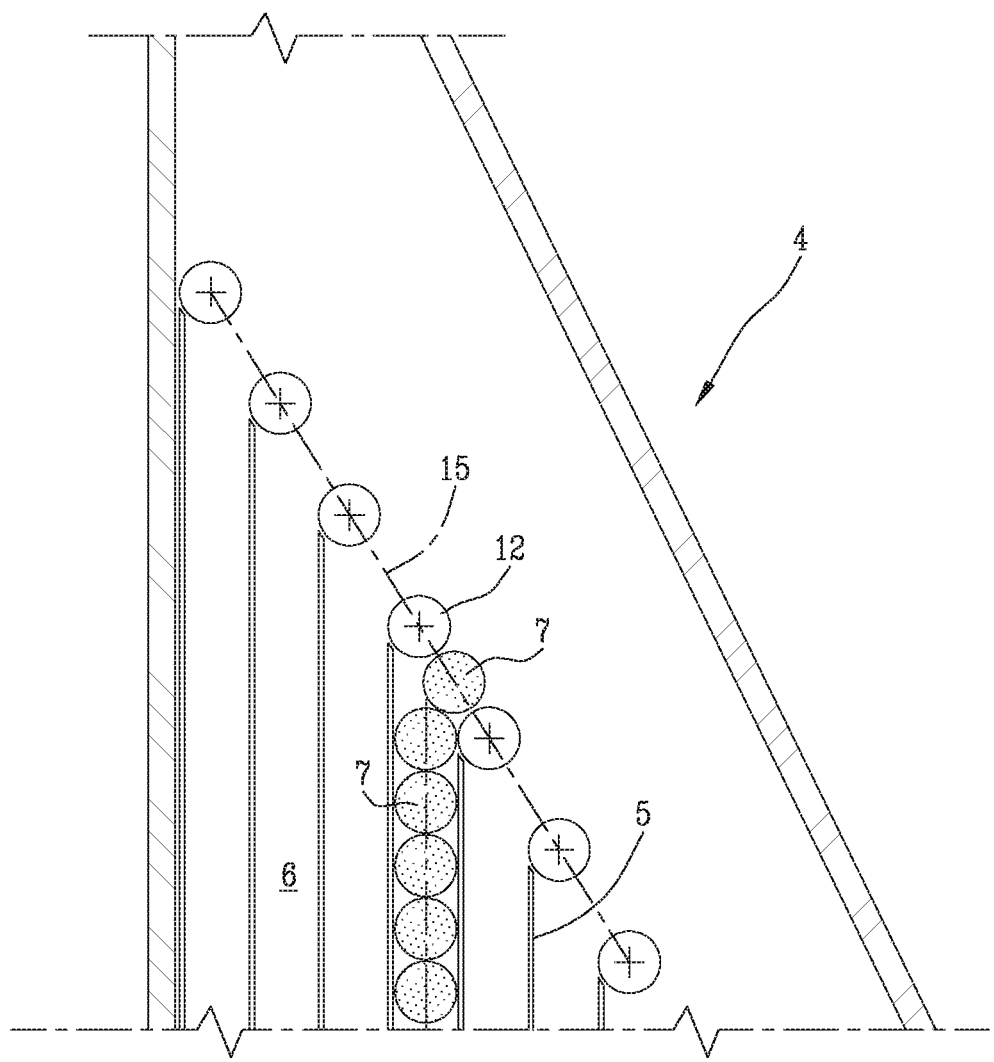

APPARATUS FOR FEEDING ROD-SHAPED ARTICLES IN A PACKAGING MACHINE

This application claims priority to Italian Patent Application BO2012A000334 filed Jun. 20, 2012, the entirety of which is incorporated by reference herein.

BACKGROUND OF THE INVENTION

This invention relates to an apparatus for feeding rod-shaped articles in a packaging machine.

More specifically, this invention addresses the tobacco industry and has for an object an apparatus for feeding articles consisting, for example, of cigarettes, filters, filter tubes (tubes of paper with a filter at one end and designed to be filled with tobacco by the smoker) in a machine which packs these articles in packets or boxes.

Hereinafter in this description, reference is made to the handling of rod-shaped articles consisting of cigarettes, without thereby restricting the scope of the invention.

In apparatuses of known type for feeding cigarettes in a packaging machine, groups of cigarettes to be packed are usually formed using a vertical hopper into which the cigarettes are fed through an opening at the top of it. The bottom portion of the hopper is divided into a plurality of mouths arranged side by side horizontally and each divided by a plurality of walls into substantially vertical channels arranged side by side horizontally. Each of the channels is designed to receive into it a stack of cigarettes superposed on each other. Groups of cigarettes, or layers which are then placed on top of one another to form the groups, are extracted by suitable extractor elements in succession from the bottom of each hopper mouth and directed to a packing station.

In order to facilitate entry of the cigarettes into the channels, there is, located just above each of the vertical walls which laterally delimit the channels, a substantially cylindrical roller or rod which oscillates in both directions about an axis parallel to the axes of the cigarettes, thereby shaking the cigarettes lightly so they move down more easily.

The presence of the rollers positioned in this manner inevitably makes the lateral size of each mouth relatively large because the distance between the channels of each pair of adjacent channels must substantially be equal in size to the diameter of a cigarette plus the diameter of a roller. That means the transversal size of the hopper is quite considerable which in turn means that the packing machine the hopper is installed in has very bulky overall dimensions.

SUMMARY OF THE INVENTION

This invention has for an aim to provide an apparatus for feeding rod-shaped articles in a packaging machine where the disadvantage of the prior art described above is appreciably reduced.

The invention accordingly provides an apparatus for feeding rod-shaped articles in a packaging machine, as described in the appended claims.

BRIEF DESCRIPTION OF THE DRAWINGS

The invention is described below with reference to the accompanying drawings, which illustrate a non-limiting embodiment of it, and in which:

FIG. 3 is a schematic front view of enlarged details of an alternative embodiment of an apparatus for feeding rod-shaped articles.

DESCRIPTION OF THE PREFERRED EMBODIMENTS

Figure 1:
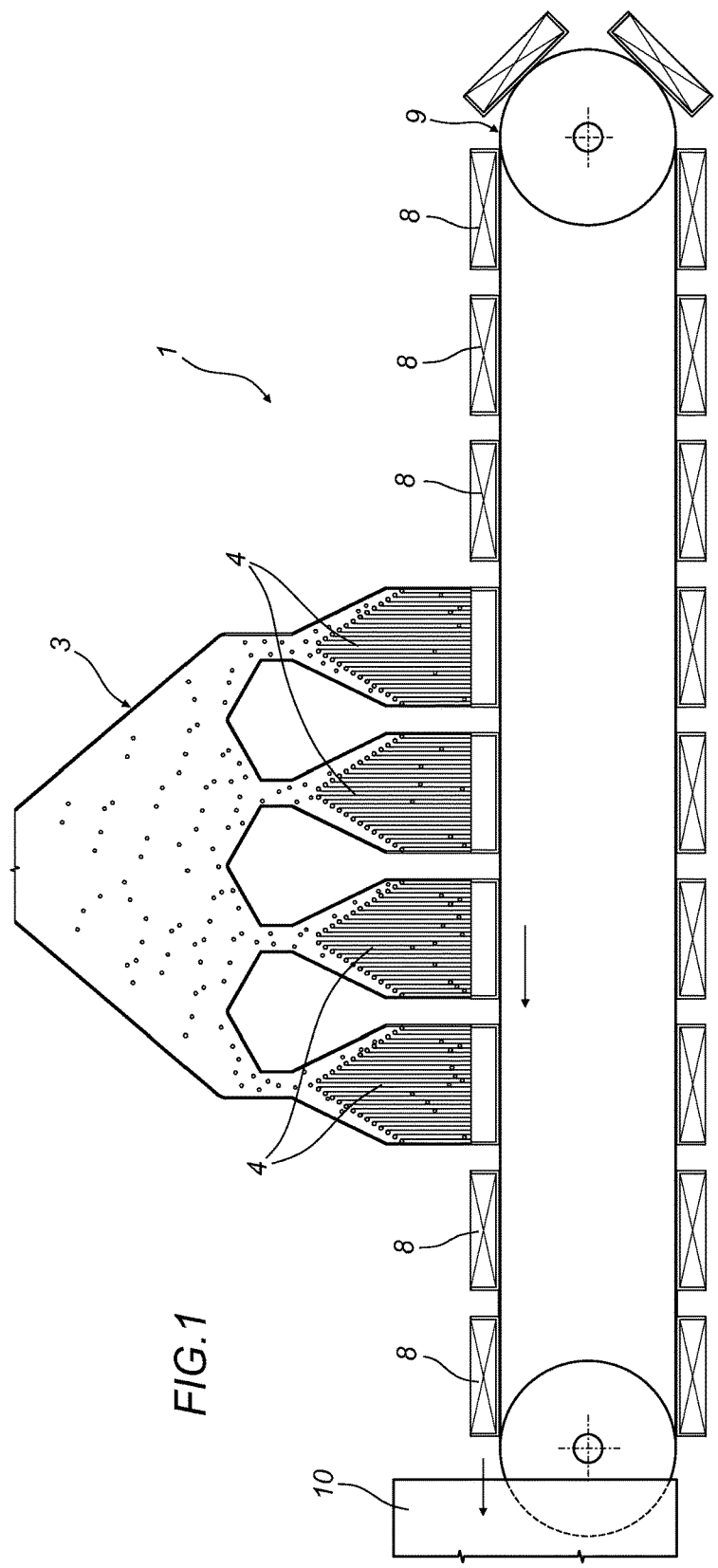
FIG. 1 is a schematic front view of an apparatus for feeding rod-shaped articles, installable in a packaging machine and made according to this invention.

The numeral 1 in FIG. 1 denotes in its entirety an apparatus for feeding rod-shaped articles, consisting for example of cigarettes 2, forming part of a packing machine not illustrated.

The apparatus 1 comprises a hopper 3 whose lower portion is equipped with at least one mouth 4 for dispensing cigarettes 2 and preferably subdivided into a plurality of mouths 4 positioned side by side horizontally. Each mouth 4 is subdivided by a plurality of walls 5 substantially vertical and parallel to each other in a plurality of substantially vertical channels 6 positioned side by side horizontally, each of which is designed to accommodate internally a stack 7 of cigarettes 2 reciprocally superposed.

Groups (not illustrated) of cigarettes 2, or layers (not illustrated) which are then placed on top of one another to form the groups in known manner, are extracted in succession from the bottom ends of the channels 6, at the bottom portion of each mouth 4 of the hopper 3, by suitable extractor elements not illustrated, which place the groups in containers 8 carried by a belt conveyor 9 which directs the groups to a packing station of essentially known type schematically represented as a block 10.

In order to facilitate entry of the cigarettes 2 into the channels 6, there is, located at a position and at a level just above the upper edge 11 of each of the vertical walls 5 which laterally delimit the channels 6, a substantially cylindrical roller or rod 12 which oscillates in both directions about an axis 13 parallel to the axes of the cigarettes 2 under the action of motor means not illustrated, thereby shaking the cigarettes 2 lightly so they enter the channels 6 more easily.

As shown in more detail in FIG. 2, the axis 13 of each roller 12 is laterally offset in a horizontal direction relative to the upper edge 11 of the vertical wall 5 below and adjacent to it. In more detail, the substantially cylindrical lateral surface of each roller 12 is positioned so it is substantially tangential to a vertical plane 16 in which one of the lateral surfaces 14 of the wall 5 adjacent and below it lies.

Figure 2:
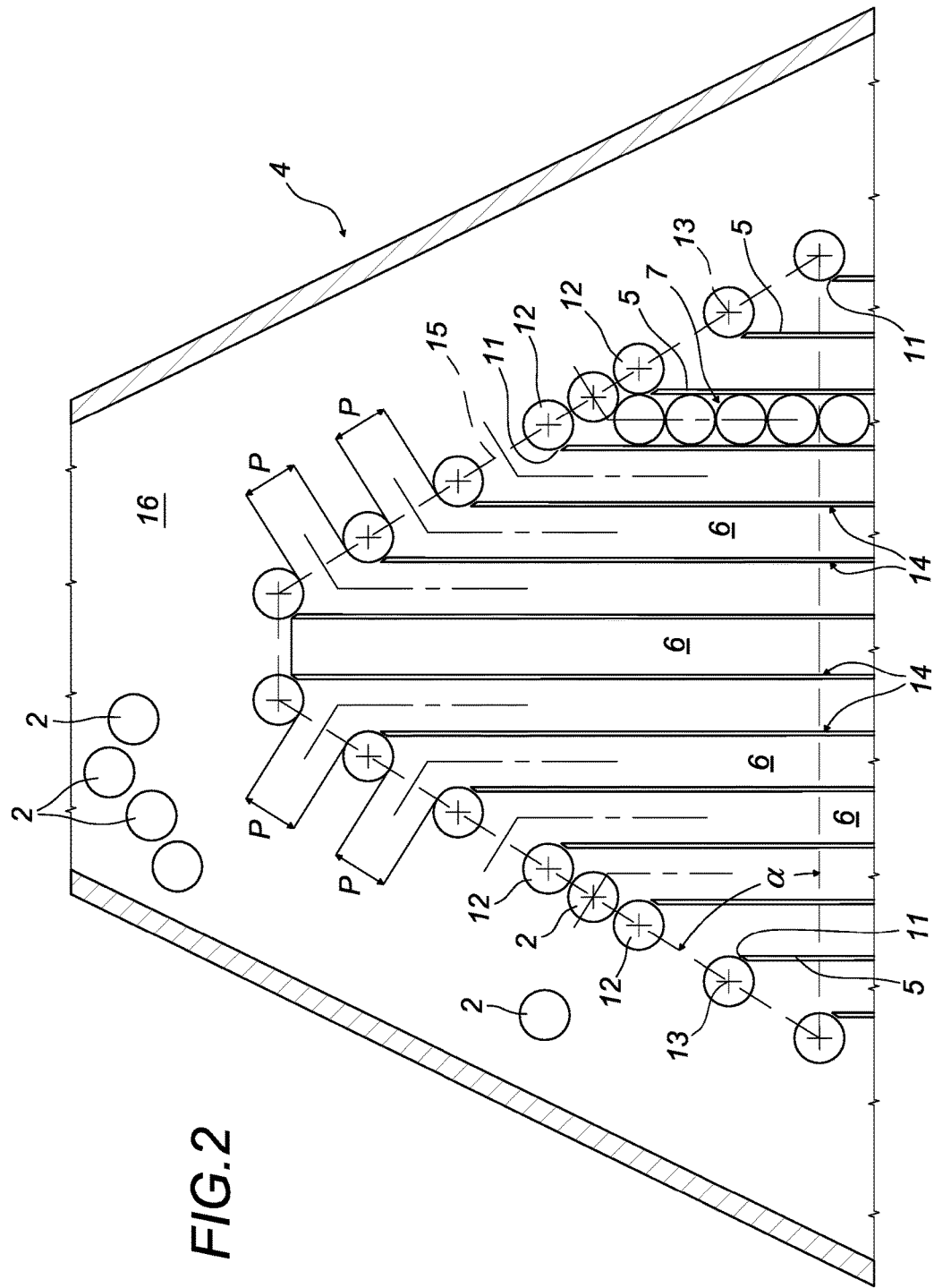
FIG. 2 is a schematic front view of enlarged details of the apparatus of FIG. 1.

As shown in FIG. 2, in order to allow the cigarettes 2 to enter the openings at the top of the channels 6, the walls 5 related to each mouth 4 of the hopper 3 are not equal in height and, more precisely, they decrease in height starting from the central walls 5 towards both sides of the mouth 4 itself.

The rollers 12 of each mouth 4 are arranged in such a way as to reflect the arrangement of the upper edges 11 of the walls 5 positioned side by side, since each of them is located just above one of the edges 11 and their axes 13 perpendicularly intersect a vertical plane 16 perpendicular to the axes of the cigarettes 2, according to an arrangement located on the sides of an isosceles trapezoid 15 whose large base is horizontal and located at the bottom. Preferably, these sides are inclined relative to the large base of the trapezoid 15 at an angle $\alpha$ whose size is between 25° and 85°, the size considered ideal for this angle being 58°.

Looking at each mouth 4 of the hopper 3 from the front, the rollers 12 above the upper edges 11 of the walls 5 situated on the left of the centre line of the selfsame mouth 4 are offset towards the left, away from the centre line, by a predetermined length in a horizontal direction relative to the upper edges 11 of the vertical walls 5 respectively below and adjacent to them, whilst the rollers 12 above the upper edges 11 of the walls 5 situated on the right of the centre line of the mouth 4 are similarly offset towards the right in a horizontal direction relative to the upper edges 11 of the vertical walls 5 respectively below and adjacent to them.

Thanks to the features described and by suitably choosing the heights of the walls 5, the width P of the passage defined between two adjacent rollers 12 above the walls 5 of each channel 6 may be just slightly greater than the diameter of a cigarette 2, and the cigarettes 2 can access the channels 6 between each pair of rollers 12. Thanks to the geometry described, the cigarettes 2 enter the channels 6 (except for the central channel 6 of each mouth 4) by moving along a short stretch, which is inclined to the vertical, as they pass between the pair of rollers 12 located just above the edges 11 of the two walls 5 which laterally delimit each channel 6.

Although it remains true, as specified above, that the spacing between each of these pairs of rollers 12 is slightly greater than the diameter of a cigarette 2 and thus, that the cigarettes 2 can enter the channels 6 without problems, the above described arrangement of each pair of reciprocally adjacent rollers 12 is such that the lateral size of each mouth 4 of the hopper 3, viewed from above, is appreciably smaller than that of prior art hoppers, since the spacing between the channels 6 of each pair of adjacent channels 6 is appreciably smaller than the diameter of a cigarette 2 added to the diameter of a roller 12.

It should be noted that in a variant embodiment of the apparatus 1 shown in FIG. 3, the walls 5 related to each mouth 4 of the hopper 3 might be decreasing in height starting from one side of the mouth 4 itself. In that case, the axes 13 of the rollers 12 related to each mouth 4 would perpendicularly intersect a vertical plane perpendicular to the axes of the cigarettes 2, according to an arrangement located on a downwardly inclined straight line.

What is claimed is:

1. An apparatus for feeding rod-shaped articles in a packaging machine, comprising:
   a hopper including a lower portion with at least one mouth for dispensing rod-shaped articles, wherein the hopper is subdivided by a plurality of walls vertically oriented and parallel to each other to create channels vertically oriented and positioned side by side horizontally, each for accommodating internally a stack of rod-shaped articles, each wall of the plurality of walls including an upper end surface extending for an entire horizontal width of the wall;
   a plurality of rollers, with each roller of the plurality of rollers positioned at a level immediately above a level of an upper end surface of a respective wall of the plurality of walls, each roller having a cylindrical shape and oscillating in two opposite directions about an axis of the roller, the axis of the roller being parallel to an axis of each of the rod-shaped articles for facilitating entry into the channels, each pair of adjacent rollers defining a passage therebetween for the rod-shaped articles;
   wherein the axis of each roller is offset laterally in a horizontal direction relative to the upper end surface of the respective wall below and adjacent to the roller to such an extent that the axis of each roller is located above a vertical projection of an upper opening of a respective channel below, so as to allow the rod-shaped articles to enter into the upper openings of the channels, the upper end surfaces of the walls of the plurality of walls relative to each channel of each mouth of the hopper are positioned at different levels such that a width of the passage defined between each pair of adjacent rollers lying above the walls of the plurality of walls relative to each channel is slightly greater than a diameter of the rod-shaped articles;
   wherein, for each mouth, the walls of the plurality of walls which are located between a central part of the mouth and at least one side of the mouth have a decreasing height from at least a central wall, located at the central part of the mouth, towards the at least one side of the mouth.

2. The apparatus according to claim 1, wherein the hopper is subdivided into a plurality of mouths positioned side by side horizontally.

3. The apparatus according to claim 1, wherein the upper end surfaces of the plurality of walls relative to each mouth of the hopper have different heights.

4. The apparatus according to claim 3, wherein the axes of the rollers relative to each mouth are positioned on sides of a virtual isosceles trapezoid having a large base horizontal and located at a bottom of the plurality of walls.

5. The apparatus according to claim 4, wherein the sides of the isosceles trapezoid are inclined relative to the large base of the trapezoid by an angle of between 25° and 85°.

6. The apparatus according to claim 5, wherein the sides of the isosceles trapezoid are inclined relative to the large base of the trapezoid by an angle equal to 58°.

7. The apparatus according to claim 3, wherein the axes of the rollers relative to each mouth are positioned on an inclined virtual straight line.

8. The apparatus according to claim 1, wherein each roller includes a cylindrical lateral surface positioned tangential to a vertical plane in which a lateral surface of one of the walls of the plurality of walls adjacent and below the roller lies.

9. The apparatus according to claim 1, wherein the plurality of walls have a decreasing height from the at least the central wall, located at a central part of the mouth, towards opposite sides of the mouth.

10. The apparatus according to claim 9, wherein the upper end surfaces of the plurality of walls are positioned at a decreasing vertical position from the at least the central wall towards the opposite sides of the mouth.

11. The apparatus according to claim 1, wherein the upper end surfaces of the plurality of walls are positioned at a decreasing vertical position from the at least the central wall towards opposite sides of the mouth.

12. The apparatus according to claim 1, wherein the plurality of walls have a decreasing height from one side of the mouth towards an opposite side of the mouth.

13. The apparatus according to claim 12, wherein the upper end surfaces of the plurality of walls are positioned at a decreasing vertical position from the one side of the mouth towards the opposite side of the mouth.

14. The apparatus according to claim 1, wherein the upper end surfaces of the plurality of walls are positioned at a decreasing vertical position from one side of the mouth towards an opposite side of the mouth.

15. The apparatus according to claim 1, wherein the upper end surfaces of the plurality of walls are positioned at a decreasing vertical position from the at least the central wall towards the at least one side of the mouth.

\* \* \* \* \*